United States Patent [19]

Schuchardt

[11] Patent Number: 4,970,295

[45] Date of Patent: Nov. 13, 1990

[54] PREPARATION OF OXETANE POLYETHER POLYOLS USING A BLEACHING EARTH CATALYST

[75] Inventor: Jonathan L. Schuchardt, Exton, Pa.

[73] Assignee: ARCO Chemical Technology, Inc., Wilmington, Del.

[21] Appl. No.: 315,956

[22] Filed: Feb. 27, 1989

[51] Int. Cl.[5] .................... C08G 65/10; C08G 65/12; C08G 65/18

[52] U.S. Cl. .................... 528/416; 528/417; 568/613; 568/617; 568/624; 568/625; 560/240; 560/263; 560/264

[58] Field of Search .............. 528/416; 568/624, 625, 568/613, 617; 560/240, 263, 264

[56] References Cited

U.S. PATENT DOCUMENTS

| | | | |
|---|---|---|---|
| 4,127,513 | 11/1978 | Bellis | 528/413 |
| 4,189,566 | 2/1980 | Mueller et al. | 528/408 |
| 4,228,272 | 10/1980 | Del Pesco | 528/413 |
| 4,243,799 | 1/1981 | Mueller et al. | 528/409 |
| 4,303,782 | 12/1981 | McHale et al. | 528/416 |
| 4,539,394 | 9/1985 | Fukuda et al. | 528/354 |
| 4,599,460 | 7/1986 | Toga et al. | 568/617 |
| 4,672,141 | 6/1987 | Motoi et al. | 568/613 |
| 4,728,722 | 3/1988 | Mueller | 528/417 |
| 4,803,299 | 2/1989 | Mueller | 560/240 |

Primary Examiner—John Kight, III
Assistant Examiner—Frederick Krass
Attorney, Agent, or Firm—Stephen D. Harper

[57] ABSTRACT

A process for the preparation of polyethers is disclosed in which an oxetane monomer, or a mixture of an oxetane monomer and an oxolane monomer, and a carboxylic acid anhydride are contacted with a bleaching earth catalyst. The process yields ester-terminated polyethers which may be saponified to obtain hydroxy-terminated polyether polyols.

26 Claims, No Drawings

PREPARATION OF OXETANE POLYETHER POLYOLS USING A BLEACHING EARTH CATALYST

This invention relates to a process for preparing a polyether which is comprised of recurring units of an oxetane monomer or recurring units of oxetane and oxolane monomers. It is more particularly directed to a process where an oxetane and, optionally, an oxolane are polymerized using a carboxylic acid anhydride and a bleaching earth catalyst to yield an ester-terminated polyether. The ester-terminated polyether may be saponified to yield hydroxy-terminated polyether polyols useful as intermediates in the preparation of segmented elastomers.

BACKGROUND OF THE INVENTION

A variety of polyether polyols are widely used as soft, flexible segments in the production of elastomeric block copolymers such as polyurethanes and polyether esters. In general, such polyether polyols are low to medium molecular weight polymers having low glass transition temperatures and at least two hydroxyl groups per polymer chain. The low glass transition temperature provides high elasticity and good low temperature performance, while the hydroxyl groups permit the polyether polyol to react with the other components of the segmented elastomers. Examples of commercially important polyether polyols include polyethylene glycol, polypropylene glycol, ethylene oxide/propylene oxide copolyols, and polytetramethylene ether glycol (poly THF).

It is desirable that a polyether polyol used as a soft segment have primary hydroxyl groups to provide good reactivity towards the electrophilic functional groups such as isocyanate or carboxylate present on the hard segment components. Furthermore, to develop optimum low temperature properties it is generally preferred that the polyether polyol be amorphous and not crystallizable. In addition, the polyether polyol should be hydrophobic since the mechanical properties of the segmented elastomer product can be adversely affected by absorption of water. The commonly used polyether polyols generally are either hydrophilic (polyethylene glycol and ethylene oxide/propylene oxide copolyols) or crystallizable (polytetramethylene ether glycol), or have secondary hydroxyl end-groups (polypropylene glycol).

For these reasons oxetane polyols and oxetane/oxolane copolyols have been investigated as polyether polyols of potential commercial interest since materials which are simultaneously amorphous, hydrophobic, and which have primary hydroxyl end-groups can be obtained by the selection of appropriate monomers. However, until now only a limited number of synthetic methods for the preparation of these oxetane-containing polyols have been developed.

Conjeevaram et al. (*J. Polym. Sci., Polym. Chem. Ed.,* 23 (1985) 429) teach the preparation of polyoxytrimethylene glycol by either of two routes. In the first method, high molecular weight polyoxetane is synthesized using an aluminum coordination catalyst then ozonized and reduced with lithium aluminum hydride. In the second route, the polyoxytrimethylene glycol is obtained directly by the cationic polymerization of oxetane using boron trifluoride/ethyl ether as catalyst and a diol as co-initiator.

Toga et al. (U.S. Pat. No. 4,599,460) teach a process for producing a polyether polyol in which 3-methyloxetane and tetrahydrofuran are copolymerized at low temperature using a hydroacid catalyst such as perchloric or fluorosulfonic acid.

Motoi et al. (U.S. Pat. No. 4,672,141) teach preparation of a 3-methyloxetane polyol using a hydroacid catalyst to polymerize the oxetane monomer at cryogenic temperatures.

All of these known methods for producing oxetane-containing polyols involve either a tedious, indirect route or the use of very low temperatures ($< -40°$ C. Such methods are not practical or economical to carry out on a commercial scale. In addition, the known methods for forming the polyether polyol directly all employ a strong acid catalyst which is either expensive, difficult to handle, or highly toxic. Most of these strong acid catalysts are soluble in the polymerization mixture and thus difficult to remove and recycle in subsequent polymerizations.

SUMMARY OF THE INVENTION

In the process of this invention, which provides a polyether comprised of from about 5 to 100 weight percent based on total polyether of recurring units of at least one oxetane monomer and from 0 to 95 weight percent based on total polyether of recurring units of an oxolane monomer, a mixture of an oxetane monomer, an oxolane monomer, and a carboxylic acid anhydride is contacted with an amount of a bleaching earth effective to accomplish polymerization of the monomers.

This invention additionally provides a method for producing an ester-terminated polyether comprising contacting an oxetane monomer (or a mixture of an oxetane monomer and an oxolane monomer) and a carboxylic acid anhydride with an amount of a bleaching earth effective to accomplish polymerization of the monomer(s). The ester-terminated polyether may be saponified to yield a hydroxyl-terminated polyether polyol suitable for use as an intermediate in the preparation of segmented elastomers such as polyurethanes.

DETAILED DESCRIPTION OF THE INVENTION

The polyethers produced by the process of this invention are comprised of from about 5 to 100 weight percent based on total polyether of recurring units of an oxetane monomer and from about 0 to 95 weight percent based on total polyether of recurring units of an oxolane monomer. The process of this invention is thus useful for the preparation of oxetane homopolymers or oxetane/oxolane copolymers. Copolymers of two or more oxetanes may also be prepared.

The oxetane monomer may be any of the four membered saturated cyclic ethers capable of polymerization by cationic means. The oxetane monomer may be substituted with one or more alkyl, aryl, halo alkyl, or other substituents. Examples of suitable oxetane monomers include oxetane, 3-methyloxetane, 2-methyloxetane, 3,3-dimethyl-oxetane, 3,3-diethyloxetane, 3,3-bis(chloromethyl)oxetane, and mixtures thereof. In general, if the polyether or its derivatives are to be used as soft segments in the preparation of elastomers, it is preferred that the homopolymer of the oxetane employed have a low glass transition temperature and little or no crystallinity. For these reasons, 3-methyloxetane is the preferred oxetane monomer.

The oxolane monomer which may optionally be present in the process of this invention is most preferably tetrahydrofuran, but substituted oxolanes capable of cationic polymerization such as 2-methyltetrahydrofuran and 3-methyltetrahydrofuran may also be used. In one embodiment of this invention, a polyether may be prepared which contains primarily tetrahydrofuran but which is non-crystalline due to the incorporation of a significant amount of an oxetane such as 3-methyloxetane. The properties and characteristics of the polyethers may thus be adjusted as desired by varying the structure of the monomers used and their relative proportions. Minor amounts of alkylene oxides (for example, ethylene oxide and propylene oxide) may also be copolymerized with the oxetane monomers.

In general, the polyether produced by the process of this invention may have a number average molecular weight of from about 250 to 10,000. Molecular weights of between about 500 and 4000 are particularly preferred if the polyethers or their derivatives are to be used in segmented elastomers. The polyethers are generally linear, although branching may be introduced by the use of difunctional monomers.

The carboxylic acid anhydride used in the process of this invention serves as a promoter in combination with the bleaching earth catalyst. The fragments derived from the anhydride generally become incorporated as ester end groups on the polyether. The degree of polymerization is influenced by the carboxylic acid anhydride concentration of the polymerization mixture. The lower the anhydride concentration, the higher the polyether molecular weight obtained, and vice versa. However, since the degree of polymerization is also affected by the properties or activity of the bleaching earth, it is normally necessary to empirically determine the anhydride concentration which gives the desired molecular weight for any particular bleaching earth. To prepare ester-terminated polyethers having a number average molecular weight of from 1000 to 3000, for example, a carboxylic acid anhydride concentration of from about 0.5 to 10 mole percent based on total monomer is normally employed.

The carboxylic acid anhydride may be derived from aliphatic or aromatic polycarboxylic acids or monocarboxylic acids having 2 to 12 carbon atoms. Examples of suitable anhydrides include, but are not limited to, butyric anhydride, valeric anhydride, caproic anhydride, phthalic anhydride, succinic anhydride, maleic anhydride, and, most preferably, propionic anhydride and acetic anhydride. Mixtures of anhydrides may be used. For reasons of cost and ready availability, acetic anhydride is preferred.

Suitable bleaching earths are aluminum silicates and aluminum magnesium silicates, which are generally referred to as montmorillonite clays. Bleaching earths of this type are commonly also referred to as "fuller's earth". The ratio of silica to the oxides of divalent and trivalent metals in these minerals is in most cases 4:1. It is preferred that the bleaching earth be activated by treating with a mineral acid such as sulfuric acid, hydrochloric acid, phosphoric acid, or nitric acid. Methods of treating a bleaching earth with a relatively concentrated mineral acid solution which will yield catalysts suitable for use in the process of this invention are described in U.S. Pat. No. 4,127,513 the teachings of which are incorporated herein by reference. Alternatively, the bleaching earth may be acid-activated by treating with dilute (<15 weight mineral acid solution and then drying the catalyst. The bleaching earth used is preferably substantially anhydrous and contains less than 3 weight percent water. U.S. Pat. No. 4,243,799, the teachings of which are incorporated herein by reference, teaches the preparation of substantially anhydrous bleaching earths suitable for use in the process of this invention.

The amount of bleaching earth employed is not critical, although the rate of polymerization is somewhat dependent on the catalyst concentration. The properties of the polyether are not substantially affected by the quantity of bleaching earth employed. Advantageous results are obtained if the bleaching earth is present in an amount of from about 1 to 20 weight percent based on the total weight of the polymerization mixture. The bleaching earth may be used in the form of a powder suspended in the mixture or as molded pellets in a fixed catalyst bed. Unlike prior art methods for preparing oxetane polyols, the process of the invention has the advantage that the catalyst can be readily removed from the polyether product and can normally be reused in subsequent polymerizations.

Polymerization generally may be carried out from about −80° C. to 100° C. However, since he rate of polymerization may be fairly slow at low temperatures and since side reactions or a broadening of the molecular weight distribution may occur at high temperatures, the temperature range of from about 10° to 50° C. is preferred. The polymerization time required to achieve the desired molecular weight and monomer conversion will vary depending on the monomers, temperature, catalyst concentration, and anhydride concentration used, among other factors. For the most part, polymerization times of from 0.5 to 10 hours will be sufficient. Oxetane monomers generally polymerize more rapidly than oxolane monomers.

In order to keep the polymerization mixture liquid and to permit efficient heat removal, it may be desirable to use an inert solvent in the process of this invention. Non-protic solvents such as chloroform and toluene are generally suitable. When the polymerization is carried out in solvent, the polyether obtained appears to contain approximately equimolar amounts of hydroxyl and ester end-groups.

Because of the generally higher reactivity of oxetane monomers compared to oxolane monomers, it is preferred when preparing a random copolyether to have only a portion of the oxetane monomer charged to the reaction vessel initially with the oxolane monomer and to continuously add the remaining oxetane monomer to the mixture. The formation of oxolane homopolymer may be avoided in this way.

After polymerization has taken place, the reaction is stopped by removing the bleaching earth catalyst. This may be done by any of the methods known for separating solids from a liquid medium, including filtration and centrifugation. If unreacted monomer, carboxylic acid anhydride, and/or solvent are present, these constituents may be removed by any appropriate distillation or stripping method.

The ester-terminated polyethers obtained by the process of this invention may be converted to hydroxy-terminated polyether polyols by any of the methods known to effect hydrolysis of a carboxylic ester functionality. The saponification may be accomplished, for example, by heating the ester-terminated polyether with an alkali metal or alkaline earth hydroxide or alkoxide in the presence of water or an alcohol. Alternatively, the ester groups may be converted to hydroxyl groups by either treatment with a hydride reducing agent or by hydrogenation using a strong base and a transition metal catalyst as described in U.S. Pat. No. 4,608,422. The teachings of this patent are incorporated herein by reference.

The polyether polyols thus produced may be used in the same manner as any other conventionally-obtained polyol, not only as the soft segment components of polyesters, polyamides, polyurethanes, and the like but also as lubricants, functional fluids, adhesives, and surfactants.

The following examples are meant to illustrate, but not limit, the process of this invention.

EXAMPLES

General Procedure

The 3-methyoxetane was prepared from 3-chloro-2-methyl propyl acetate using known procedures (U.S. Pat. No. 4,599,460) and dried by distillation from calcium hydride prior to use. The catalyst was prepared by placing 200 g fuller's earth (Aldrich) in a column and washing with 400 ml 5% (v/v) sulfuring acid at 5°–10° C. The flow rate through the column was adjusted so that the acid wash required ca. 20 minutes. The catalyst was then washed with 800 mL water and 400 mL acetone, blown dry with a nitrogen stream, and dried at 130° C. for 16 hours (100 mm).

The 3-methyloxetane, catalyst, acetic anhydride, and (optionally) chloroform were combined at room temperature in the amounts shown in Table I. A round bottom glass flask equipped with nitrogen bubbler and stirrer was used. Polymerization was initiated in the neat mixtures (Example 1–3) by warming slightly. The examples using chloroform as solvent (Examples 4–6) were refluxed. After 1–2 hours the reaction product was filtered through a pad of diatomaceous earth filter aid and stripped of volatiles under vacuum on a rotary evaporator. Yields were calculated from the weight of polyether obtained compared to the weight of 3-methyloxetane charged. Molecular weight and molecular weight distribution (Mw/Mn were determined by gel permeation chromatography using poly(tetrahydrofuran) calibration standards. Analysis by $^{13}C$ NMR and infra-red spectroscopy determined that the polyethers obtained in Examples 1–3 were ester-terminated, while the products of Examples 4–6 contained approximately equimolar amounts of hydroxyl and ester endgroups.

percent based on total polyether of recurring units of the oxetane monomer and from about 0 to 95 weight percent based on total polyether of recurring units of the oxolane monomer, and wherein the number average molecular weight of said polyether is within the range of about 250 to 10,000.

2. The process of claim 1 wherein the oxetane monomer is selected from the group consisting of oxetane, 3-methyloxetane, 3,3-dimethyloxetane, 3,3-dethyloxetane, 2-methyloxetane, and mixtures thereof.

3. The process of claim 1 wherein the oxolane monomer is tetrahydrofuran.

4. The process of claim 1 wherein the oxetane monomer is 3-methyloxetane and the oxolane monomer is tetrahydrofuran.

5. The process of claim 1 wherein the carboxylic acid anhydride is acetic anhydride.

6. The process of claim 1 wherein the bleaching earth is acid-treated.

7. The process of claim 1 wherein the bleaching earth is substantially anhydrous.

8. The process of claim 1 wherein the bleaching earth is acid-treated and substantially anhydrous.

9. The process of claim 1 wherein the bleaching earth is an aluminum magnesium silicate.

10. The process of claim 1 wherein the bleaching earth is a montmorillonite clay.

11. The process of claim 1 wherein the polyether consists essentially of recurring units of the oxetane monomer.

12. The process of claim 1 wherein the polyether consists essentially of recurring units of 3-methyloxetane.

13. The process of claim 1 wherein the polymerization of the monomers is carried out in the presence of a solvent.

14. A process of claim 1 comprising the additional step after polymerization of separating the bleaching earth from the polyether.

15. A process for producing an ester-terminated polyether comprised of contacting a monomer mixture consisting essentially of one or more oxetane monomers with a carboxylic acid anhydride and an amount of a bleaching earth effective to accomplish polymerization of the monomer mixture wherein the number average molecular weight of said ester-terminated polyether is within the range of about 250 to 10,000.

16. The process of claim 15 wherein the oxetane monomer is selected from the group consisting of oxetane,

TABLE I

| | PREPARATION OF ESTER-TERMINATED POLY(3-METHYLOXETANE) DIOLS | | | | | |
|---|---|---|---|---|---|---|
| EXAMPLE | 1 | 2 | 3 | 4 | 5 | 6 |
| 3-Methyloxetane, g | 10.0 | 10.0 | 10.0 | 10.0 | 10.0 | 10.0 |
| Ac$_2$O, g | 0.94 | 0.94 | 0.25 | 0.94 | 1.90 | 0.26 |
| Catalyst, g | 1.0 | 0.50 | 0.50 | 0.50 | 0.50 | 0.50 |
| Chloroform, mL | — | — | — | 10.0 | 10.0 | 10.0 |
| Yield, % | 85 | 94 | 98 | 78 | 83 | 69 |
| M$_n$, GPC | 2010 | 2310 | 2750 | 2700 | 1910 | 1400 |
| Mw/Mn, GPC | 4.9 | 5.0 | 4.4 | 3.0 | 3.8 | 3.0 |

I claim:

1. A process for producing a polyether comprised of contacting an oxetane monomer, a carboxylic acid anhydride, and optionally an oxolane monomer with an amount of a bleaching earth effective to accomplish polymerization of the monomers, wherein the resulting polyether is comprised of from about 5 to 100 weight 3-methyloxetane, 3-3-bis(chloromethyl)oxetane, 3,3-dimethyloxetane, 3,3-diethyloxetane, 2-methyloxetane, and mixtures thereof.

17. The process of claim 15 wherein the carboxylic acid anhydride is acetic anhydride.

18. The process of claim 15 wherein the bleaching earth is acid-treated.

19. The process of claim 15 wherein the bleaching earth is substantially anhydrous.

20. The process of claim 15 wherein the bleaching earth is acid-treated and substantially anhydrous.

21. The process of claim 15 wherein the bleaching earth is an aluminum magnesium silicate.

22. The process of claim 15 wherein the bleaching earth is a montmorillonite clay.

23. The process of claim 15 wherein the polymerization of the oxetane monomer is carried out in the presence of a solvent.

24. The process of claim 15 comprising the additional step after polymerization of separating the bleaching earth from the ester-terminated polyether.

25. A process for producing a hydroxy-terminated polyether comprised of saponifying the ester-terminated polyether produced in accordance with the process of claim 15.

26. A process for producing a hydroxy-terminated polyether comprised of hydrogenating the ester-terminated polyether produced in accordance with the process of claim 15.

* * * * *